Figure 1:
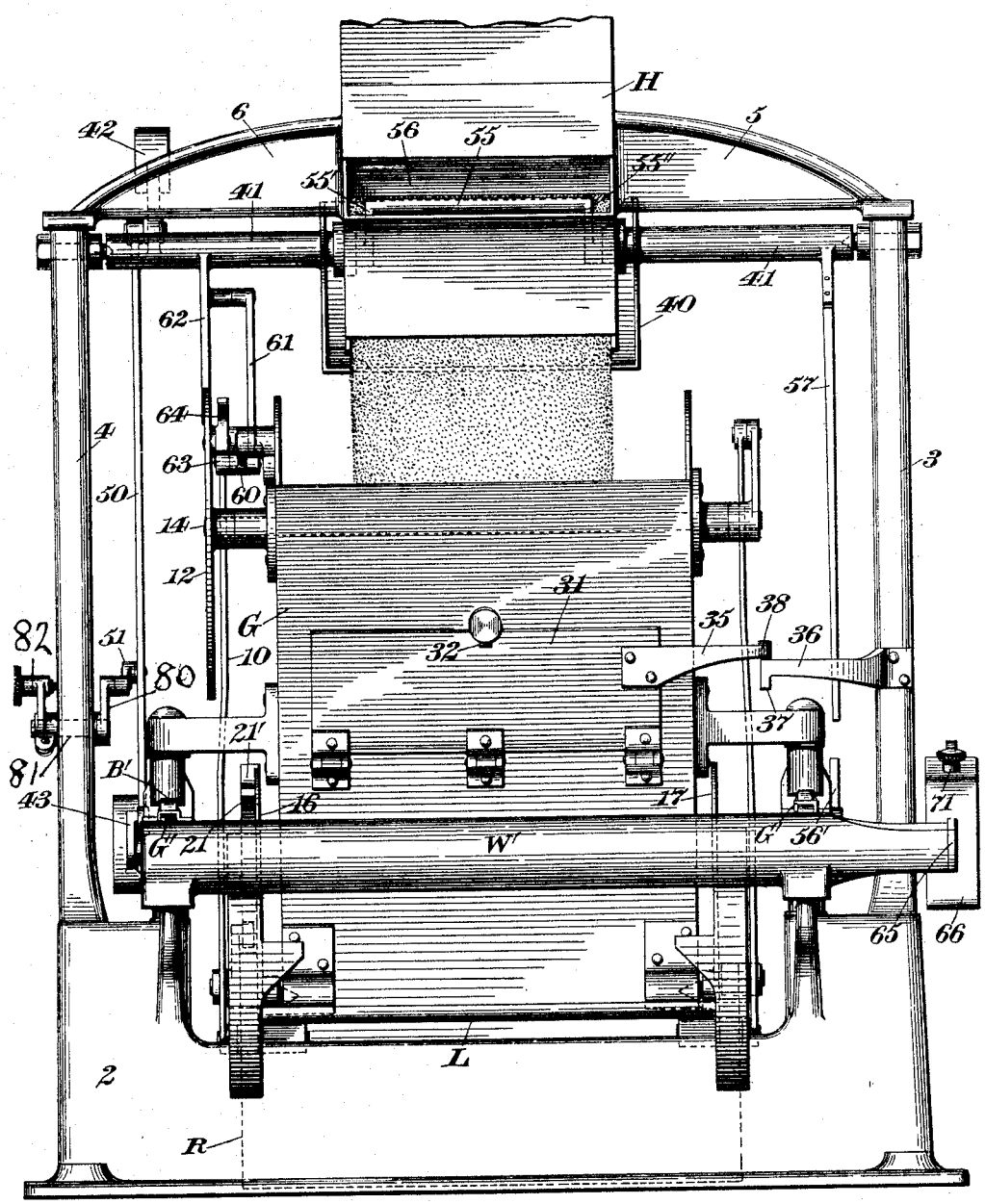

(No Model.)   6 Sheets—Sheet 1.

F. H. RICHARDS.
WEIGHING MACHINE.

No. 585,971.  Patented July 6, 1897.

Witnesses
Chas. F. Schmelz
Fred. J. Dole.

Inventor
F. H. Richards.

(No Model.)
6 Sheets—Sheet 2.

F. H. RICHARDS.
WEIGHING MACHINE.

No. 585,971.  Patented July 6, 1897.

Witnesses
Chas. F. Schmelz
Fred. J. Dole.

Inventor
F. H. Richards (No Model.)  6 Sheets—Sheet 3.

F. H. RICHARDS.
WEIGHING MACHINE.

No. 585,971.  Patented July 6, 1897.

Witnesses
Chas. F. Schmelz
Fred. J. Dole.

Inventor
F. H. Richards (No Model.)  6 Sheets—Sheet 5.

F. H. RICHARDS.
WEIGHING MACHINE.

No. 585,971.  Patented July 6, 1897.

Witnesses  Inventor
Chas. F. Schmelz  F. H. Richards
Fred. J. Dole.

(No Model.) 6 Sheets—Sheet 6.

F. H. RICHARDS.
WEIGHING MACHINE.

No. 585,971. Patented July 6, 1897.

Witnesses
Chas. F. Schmelz
Fred. J. Dole.

Inventor
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 585,971, dated July 6, 1897.

Application filed December 2, 1896. Serial No. 614,189. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering predetermined charges of granular and other free-running materials.

With respect to one of its objects the invention comprehends the provision, in connection with a load-receiver or bucket having a closer for its discharge-outlet and also having an opening by which access may be readily had to the interior of the bucket for the purpose, primarily, of cleaning the walls of the bucket or the closer-joint of adhering material, of a door which may be hinged to the bucket for closing said opening, and to provide in connection with said door locking means for preventing the opening of the door until the bucket has reached a certain point or the limit of its upstroke, said locking means being also operable to prevent the action of the weighing mechanism or the bucket while the door is open.

Another object of the invention is to furnish, in combination with the closer for the bucket, a toggle which will preferably be of the "dead-lock" type, and its function will be to hold the closer shut during the load-supplying period without the necessity of a latch for this purpose, means operative with the stream-controller being preferably provided to break up or flex the toggle by throwing the several pivots out of line, which action results in the release of the closer, so that it can be instantly forced open by the weight of the load within the bucket.

Another object of the invention is to provide, in connection with the supply-hopper of the machine, an agitating device or stirrer operable therein and preferably by the power of the stream-controller for the hopper, the office of such agitating device being to loosen up the supply of material within the hopper sufficiently to insure its free passage therefrom to the load-receiver or bucket when the stream-controller is actuated or opened.

Figure 2:
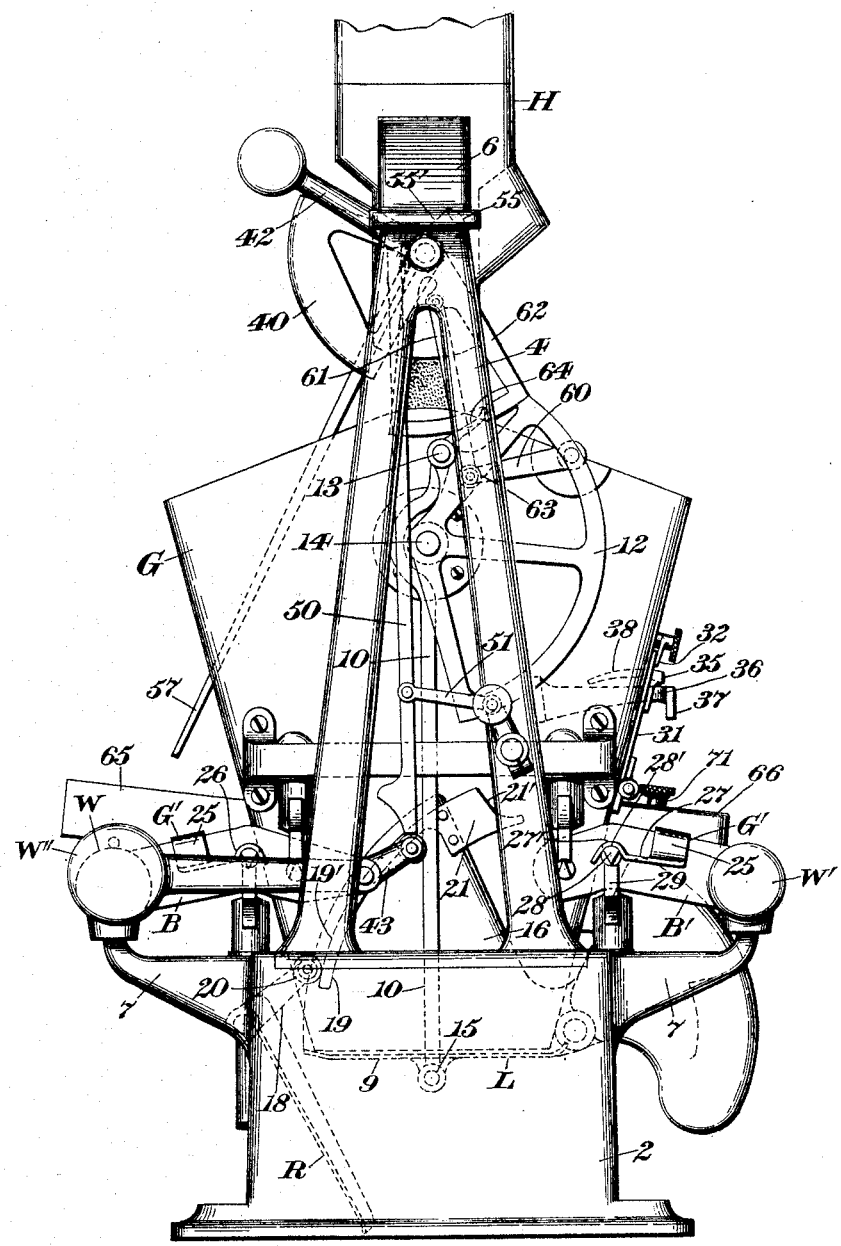
Figure 3:
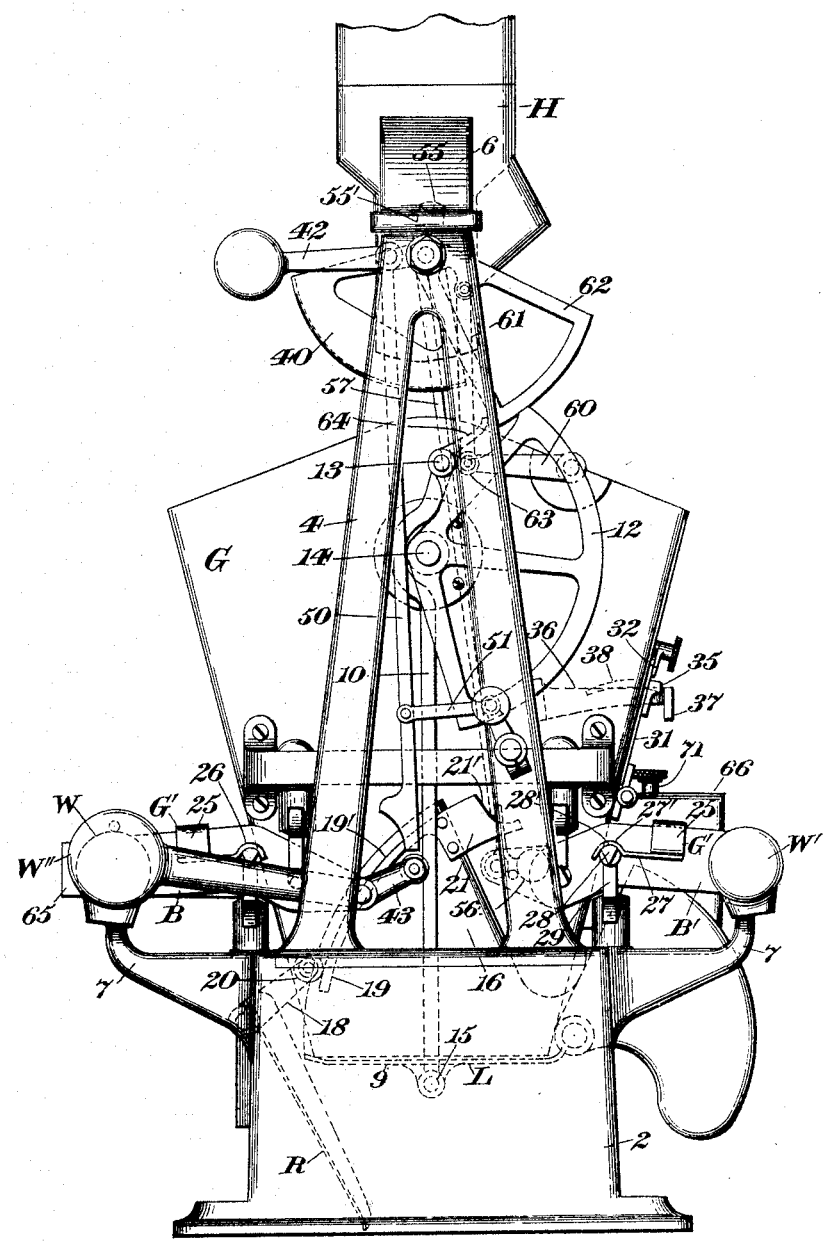
Figure 4:
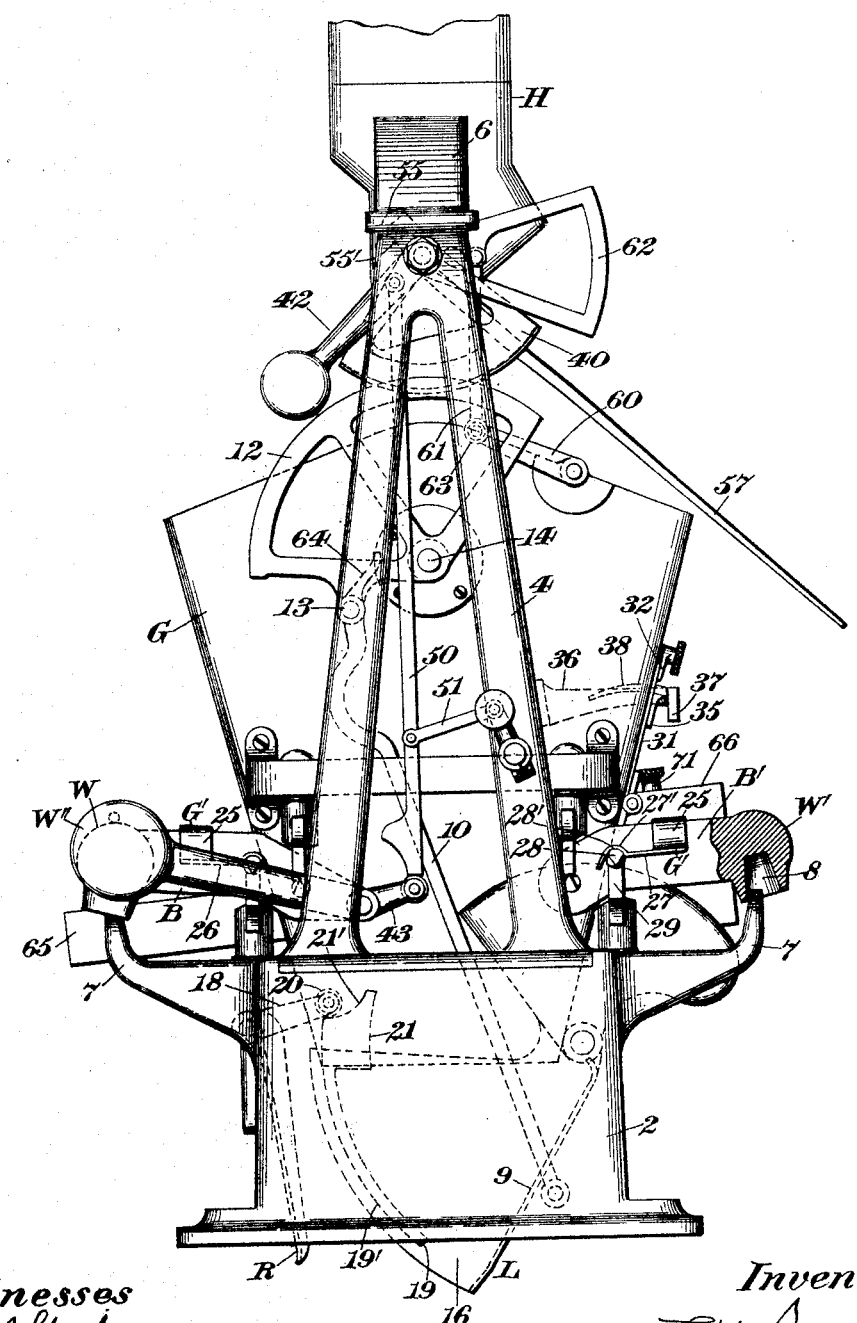
Figure 5:
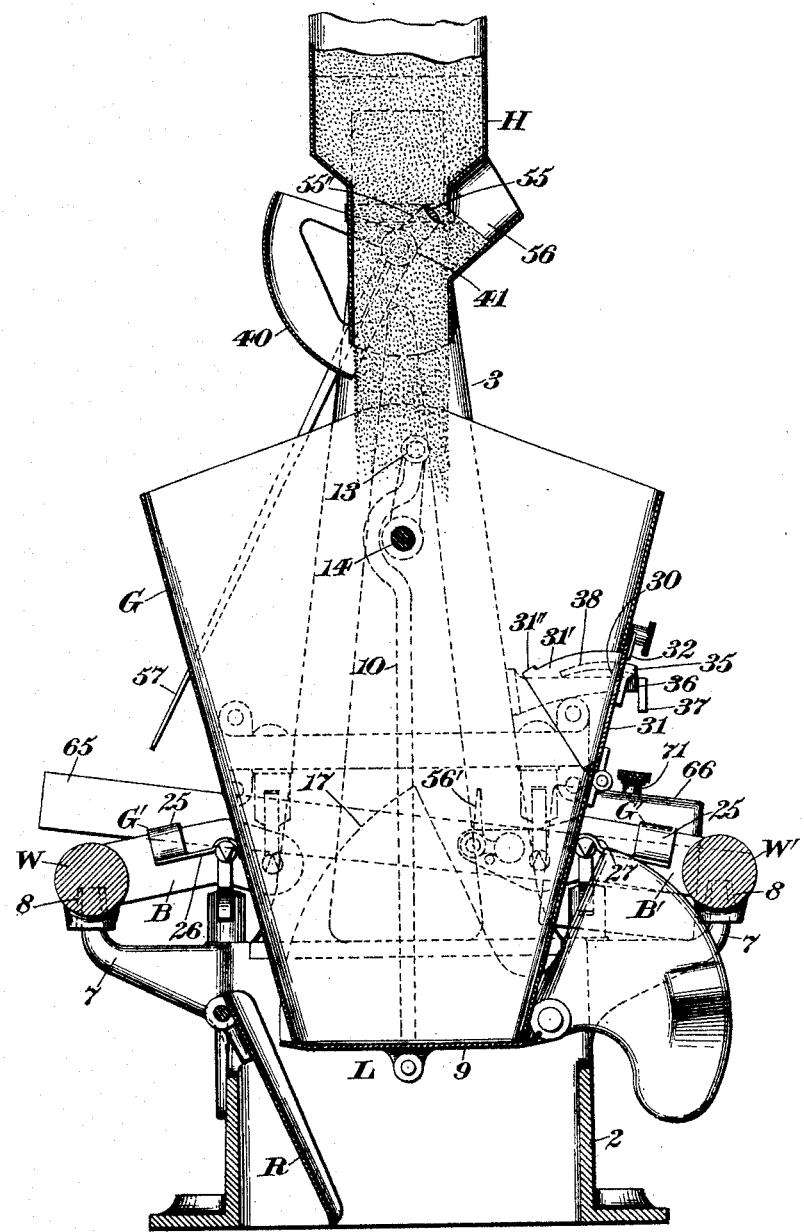
Figure 6:
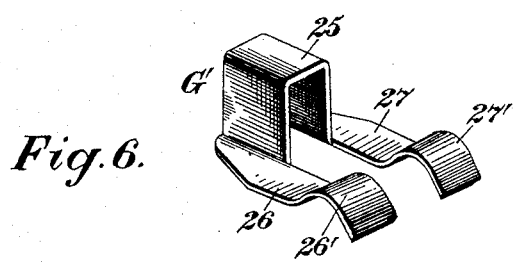
Figure 7:
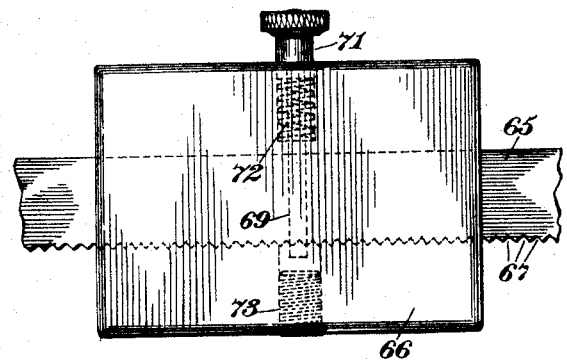
Figure 8:
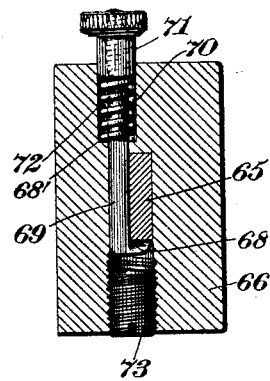

In the drawings accompanying and forming part of this specification, Figure 1 is a front elevation of a weighing-machine embodying my present improvements, and it represents the positions occupied by the respective parts at the commencement of operation. Fig. 2 is an end elevation of the machine as seen from the left in Fig. 1, the parts being in positions corresponding with said figure. Fig. 3 is a similar view, the bucket having descended somewhat and the valve being partially closed or at the drip position, where it is held. Fig. 4 is a similar view illustrating the valve as being in its fully-closed position and the bucket-closer as wide open to permit the discharge of a load from the bucket. Fig. 5 is a longitudinal central vertical section of Fig. 1. Fig. 6 is an enlarged perspective detail of a knife-edge guard; and Figs. 7 and 8 are enlarged details in elevation and cross-section, respectively, of a scale-beam and its weight and means for holding the latter against movement.

Similar characters designate like parts in all the figures of the drawings.

The framework for carrying the respective operative parts and mechanisms of the machine may be of any suitable character, and in the form illustrated it comprises the chambered supporting base or bed 2, the end frames or columns 3 and 4, which rise therefrom, and the brackets 5 and 6, which are connected to said end frames and which extend oppositely from the supply hopper or chute H, which constitutes a convenient means for delivering the supply-stream to the load-receiver or bucket of the weighing mechanism.

The weighing mechanism, which is similar in operation to that disclosed by Letters Patent No. 548,840, granted to me October 29, 1895, to which reference may be had, includes a load-receiver and supporting beam mechanism therefor, the load-receiver consisting of the single-chambered bucket G and the beam mechanism therefor comprising a pair of oppositely-disposed counterweighted beams B and B', respectively, fulcrumed upon the base 2 in the manner illustrated by my aforesaid Letters Patent.

Each of the scale-beams is made up of two longitudinal arms and a cylindrical weight which joins said arms, the weight for the beam B being designated by W and the weight for the beam B' being designated by W', said weights when the machine is at rest being sustained by the beam-supports 7, which are in the form of rigid arms extending from the opposite ends of the base.

I provide the scale-beam weights W and W' with a series of recesses which are relatively deep and which are designated by 8 and which inclose the beam-supports 7 as the beam reciprocates to thereby prevent particles or grains of material from falling upon the upper edges of the beam-supports 7, the respective beam-supports being in contact with the upper faces of the recesses 8 when the beams are in their normal positions, as indicated in Figs. 2 and 4, while said recesses are sufficiently deep as to have their walls circumscribe the supports 7 when the weights W and W' are at their highest positions, as indicated in Fig. 4.

The bucket G will have the usual discharge-outlet, which is controlled by a shiftable load-discharge member or closer, which is designated in a general way by L and which consists of a flat plate or closer proper, 9, pivotally supported at one side of the outlet and which is adapted when closed to approximately fit against the lower edge of the bucket, (see Fig. 5,) said closer being also counterweighted, as is customary, the purpose of the counterweight or counterweights being to return said closer to its shut position on the discharge of a load.

To maintain the closer L shut and to obviate the employment of a latch, I employ a toggle of the dead-lock type, one of the members being designated by 10 and the other being designated by 12 and consisting of a rocker pivotally mounted upon the bucket G and pivoted at 13 to the connecting-rod 10, which is likewise attached to the closer L, the several pivotal points 13, 14, and 15 being so disposed that the pivotal point or joint 13 will be at one side, or to what is herein shown as the right, of a dead-center line, it being evident that when the point 13 is carried to the opposite side or to the left of said dead-center line the closer L can be forced open; and the instrumentalities for effecting this operation automatically will be hereinafter described.

The closer L at opposite sides thereof will be furnished with the guard-walls 16 and 17, which, when the closer is open, as indicated in Fig. 4, prevent lateral flow of the material from the bucket.

I employ for coaction with the bucket-closer L a swinging or oscillatory regulator, which is designated by R and which consists of a flat plate pivotally supported within the base 2, adjacent to the closer, and said regulator is provided with an angular arm or member 18, which coacts with the segmental flange or stop 19 on the guard-wall 16, said arm 18 being furnished with an antifriction-roll 20, which serves its well-known purpose and which rolls in contact with the curved face 19' of the segmental flange 19 as the closer opens and shuts.

The regulator R will have a preponderance of weight below its center of movement, and it will be held in its effective working position by the stop-flange 19, as represented in Fig. 2, against which the roll 20 abuts, except when said closer has nearly reached the end of its opening movement.

The flange 19 is broadened or widened out at its upper end, as at 21, and such broadened or widened portion has the overrun curved stop-face 21', the plane of which intersects the plane of the curved stop-face 19'.

Let it be assumed that the closer is released. When this action takes place, it will be quickly opened by the weight of the material within the bucket, and as it opens the material from the bucket will be discharged against the regulator R, which, however, is held against movement by the stop-flange 19. When the closer has nearly reached the limit of its opening movement, the overrun stop-face 21' will be opposite the roll 20, and the pressure of the mass acting against the regulator R will swing it to the left, and its roll will be caused to travel along the overrun stop-face 21', as indicated in Fig. 4, whereby the closer L will be maintained in its wide-open position sufficiently long to allow the bucket to completely empty itself. When the discharged mass has passed below the lip of the regulator R, the pressure thereon will be naturally removed, freeing said regulator and consequently the adjacent closer L, so that the latter can then be shut.

It is customary to support the scale-beam by a notched bearing upon which rests the knife-edge pivot carried by the beam, and for the purpose of preventing particles of the material being weighed from working between the knife-edge and its notched bearing I provide a guard for the knife-edge, a series of such guards being illustrated in the various end elevations and one of them being represented in detail in Fig. 6, it being designated in a general way by G'. The knife-edge guard, which is removably carried by a beam, consists of a shank or body portion 25, which is adapted to straddle and preferably frictionally engage the side faces of the scale-beam, the whole being made of spring or resilient material to facilitate its application to and removal from the scale-beam in connection with which it may be used, and it may be readily stamped in one piece from sheet metal and bent up to proper shape. The shank or body portion 25 has extending therefrom the arms 26 and 27, respectively, which constitute protecting-hoods for the knife-edges.

Attention is invited to Fig. 2, wherein a knife-edge is illustrated at 28, said knife-edge extending oppositely from the face of an arm of the beam B', its notched bearing being designated by 29, and the upper portion of said knife-edge is rounded, as at 28', the hood or arm 27 of the guard G' being curved near its free end, as at 27', and such curved portion will be contiguous to the rounded portion of the knife-edge just alluded to, the hood or arm 27 being of a width slightly exceeding the distance that the knife-edge projects from the beam-arm, the hood 26 being furnished to extend over the other portion of the knife-edge which is not seen in the end elevations, but which is of ordinary construction.

One of the walls of the bucket G will have an opening therein, as 30, (see Fig. 5,) which is normally closed by the door 31, and the latter when opened will permit the introduction of a hand into the bucket for the purpose of cleaning the sides of the bucket or closer-joint of adhering material.

The door 31 is suitably hinged adjacent to the lower side of the opening 30 and will have at its ends suitable wings, as 31', which have stop-lugs, as 31'', which abut against the bucket to prevent the too wide opening of the door.

In conjunction with this said door locking means are provided operable to prevent the opening thereof until the bucket has reached a predetermined point in its travel or, in the present case, until it is at the limit of its ascending stroke or upstroke, said locking means being also operable to preclude the descent of the weighing mechanism until the door is wholly shut, a catch, as 32, being conveniently employed to hold the door closed, the locking means to which I have alluded serving as a safety means.

The locking means in the present case consist of the oppositely-disposed brackets or arms 35 and 36, riveted or otherwise secured, respectively, to the door 31 and to the end frame 3, as indicated in Fig. 1. The bracket or arm 36 has at its outer free end the right-angled flange 37, which as the bucket descends coöperates with the stop-bracket 35 on the hinged door 31 to prevent opening of said door.

In Fig. 2, wherein the bucket G is shown at the limit of its upstroke, it will be observed that the bracket 35 is located at a point slightly above the bracket 36. When, however, the bucket begins to descend during the loading period, the bracket 35 will be moved therewith, and when it reaches a point directly opposite the bracket 36, as indicated in Fig. 3, the bracket 36 will act as a positive lock to prevent opening of the hinged door 31. The bracket 35 is furnished with the curved stop-pin 38, (see dotted lines, Figs. 2, 3, 4, and 5,) its under face being concentric to the axis of movement of the swinging door, and as said door is opened such curved face will engage the upper face or edge of the bracket 36 at its outer end, whereby the descent of the bucket will be positively blocked.

The stream-controller for the supply-stream consists in the present instance of a valve which is reciprocatory below the mouth or outlet of the hopper H to either permit or arrest the passage of material thereto, such stream-controller or valve being designated by 40 and being pivotally supported between the end frames 3 and 4 for oscillatory movement, it being carried by the two-part supporting-shaft 41, which has openings in its opposite ends for receiving journals or pivot-screws carried by said end frames. For shutting the valve 40 to cut off the supply-stream I provide the weighted arm or valve-closing actuator 42, which extends rearward from the two-part shaft 41 and which exerts a constant valve-closing effect, which, however, is suitably controlled from the weighing mechanism, as by the shiftable counterweighted lever 43, which is carried by the beam B and the weight W'' of which normally forms a part of the counterweight W, but which when the lever is shifted about its center is subtracted therefrom and added to the bucket mechanism. As the lever just mentioned returns to its normal position it is operable, through proper means, for transmitting its force to the valve to open the same.

A relatively long thrust-rod is illustrated at 50, it being pivoted to the counterweighted valve-actuator 42, near the inner end thereof, while its free end bears against the shiftable counterweighted lever 43, said rod being also connected by the guide-link 51 to the framing of the machine. The shiftable lever 43 will normally form a part of the counterbalance scale-beam B, so that as it descends therewith, the rod 50 being in contact with said part 43, the closure of the stream-controller or valve 40 can be properly limited or checked.

Fig. 4 represents the beam mechanism and the lever 43 occupying the lowest positions thereof, and the beams B and B', as the bucket is lightened by the discharging of the load, can return to their initial positions, the lever moving a short distance therewith, its complete return, however, being prevented by interlocking stop mechanism, as will hereinafter appear. When said lever is released, it will promptly return to its primary position, and in so doing will transmit an upward thrust to the rod 50 for forcing the coöperating valve open in the manner substantially illustrated in the hereinbefore-mentioned Letters Patent.

In connection with the valve I employ an agitating device, which is situated within the chute or hopper H and which is operated by the valve, the function of said agitating device being to break up or loosen the mass within the hopper to insure its free passage into the bucket as the valve is opened. Such agitating device is designated by 55, (see Figs. 1 and 5,) and it consists of a bar reciprocatory within the hopper and having the arms 55' and 55'' at its ends, which are joined to the sections of the two-part valve-carrying shaft 41, said bar being elliptical in cross-section to insure its better passage through the supply within the hopper. The hopper also has the pocket 56, into which the material can back up as the valve opens to prevent blocking or crowding thereof within the hopper, and said pocket also provides a means by which access may be had to the interior of the hopper for the removal of sticks, &c., therefrom.

Means are furnished for intercepting the advancing movement or closure of the valve to permit a reduced or drip stream to flow from the hopper H into the bucket G for the purpose of topping off or finishing the partial load therein, and which comprises the by-pass stop 56' on arm of the beam B', which is disposed in the path of movement of the rod 57, carried by the two-part valve-shaft 41, so that said by-pass stop may engage the rod 57 to hold the valve, as shown in Fig. 3, to allow the drip-stream to enter the bucket G.

When the load is completed by the drip-stream, the bucket and beams will descend, the by-pass 56' thereby being moved away from the end of the rod 57, which releases the valve 40, whereby it can be given its final closing movement by the actuator 42 to promptly cut off the supply.

To throw the several pivots of the toggle members 10 and 12 out of line, I have illustrated a toggle-actuator carried by the bucket G, it consisting of a lever 60, pivotally mounted thereon and preferably operated by the power of the valve, said lever being connected by the link 61 to the open or skeleton segment 62, which depends from the two-part valve-shaft 41. The pivot which connects the link 61 and the lever 60 is furnished with an antifriction-roll 63, which is adapted to ride along the face of the cam 64 on the toggle member during the final closing movement of the valve, to thereby break the toggle-joint 13.

The valve 40 is shown in its drip position in Fig. 3, and it will have an excess of movement beyond that which is requisite to stop the drip for the purpose of throwing the toggle-pivots out of line. As the valve advances from the position shown in Fig. 3 to that illustrated in Fig. 4 the link 61, and consequently the lever 60, will be elevated, which results in carrying the roll 63 into contact with and along the face of the cam, so that when the valve has nearly reached the end of its travel and subsequent to the cut-off of the supply-stream the toggle-joint 13 will be broken, so that the closer L can be then opened, this last-mentioned operation being obtained by the weight of the material within the bucket.

To insure safety and for the purpose of preventing material from running through the bucket without registration, I employ in conjunction with the valve reciprocally-effective stops, the segment 62, to which I have previously referred, serving as one of said stops, while the other is the toggle member 12. The valve being wide open, as indicated in Fig. 2, the segment 12 will be contiguous to the curved face of the coöperating stop or segment 62, to thereby prevent flexing of the toggle members 10 and 12 until after the valve 40 has cut off the supply-stream, and when said valve has stopped the supply the segment or stop 62 will have been carried bodily across the plane of the curved face of the segment or stop 12, so that the latter can be then oscillated by the breaking of the toggle-joint and the opening of the closer, and the curved face of the segment 12 of the said segment or stop will be relatively adjacent to the stop or segment 62, as indicated in Fig. 4.

The load being discharged, the emptying bucket and beam mechanism will rise, and the lever 43, moving synchronously therewith, will force the rod 50 upward and will retract the valve until the stop-segment 62 meets its mate, but the opening of the valve will not be far enough to permit the material to pass from the hopper. When the stop 12 meets its companion 62, the return movement of the shiftable lever or valve-opening actuator 43 will be blocked by the stop 62, although the two beams can return to their initial positions.

When the closer is shut and locked, the stop 12 will release the stop 62, and consequently the lever 43, so that the latter in returning to its normal position will transmit an upward thrust to the valve 40, through the rod 50, for forcing said valve open.

The weight W' of the beam B' has attached thereto the auxiliary beam 65, which carries for sliding movement the weight 66, so that as said weight is slid beyond a properly-located zero-point on the auxiliary beam 65 its force will be added practically to the bucket mechanism, whereby a load less than the capacity of the bucket G may be properly weighed and delivered.

To hold the weight 66 in an adjusted position on the beam 65, I provide readily-operable and efficient means. The under face of the beam 65 is indented or serrated, as at 67, and a pin or bolt carried by the slidable weight 66 will be provided for engaging the auxiliary beam 65, an actuator being preferably provided to force the sharpened head 68 of the pin or bolt 69 between the indentations 67 on the beam. The slidable weight 66 is transversely bored or recessed, as at 70, for the reception of said pin, which is provided with a removable screw-threaded cap or collar 71, which serves as a shoulder on said pin, and against which shoulder the coiled protractile spring or actuator 72 is adapted to bear, said spring being seated within the bore 68 and resting upon the shoulder 68' thereof.

By pressing downward upon the cap or thumb-piece 71 the spring 72 may be compressed to withdraw the head of the pin from between the indentation 67, so that the weight 66 can be readily moved along the auxiliary beam 65. When pressure is removed from the thumb-piece 71, the spring 72 will force the head of the pin between the indentations 67.

A removable binding-screw is shown at 73, it being set within the wide portion of the bore 70, and it can bind against the head of the pin to hold the same in a set position, said screw providing a means for placing the pin within the weight 66.

The link 51, to which I have referred, is connected to a crank-arm 80 on the inside end of the rock-shaft 81, which is carried by the end frame 4. The outer end of said rockshaft 81 is furnished with an operating crank-arm 82, so that by swinging the latter by hand the rod 50 can be thrown into and out of connection with the actuator or lever 43 in the manner set forth by the Letters Patent hereinbefore referred to, said rod being thrown out of connection with the lever when a test is to be made.

The operation of the hereinbefore-described machine, briefly, is as follows: Fig. 2 represents the positions occupied by the various parts at the commencement of operation, the closer L being shut and locked in such position by the toggle members 10 and 12 and the valve 40 being wide open. This being the case, the full volume of the supply-stream will gravitate from the hopper H into the empty bucket G. When a certain proportion of the load has been received by the bucket, it, with the beam mechanism, including the counterweighted lever 43, will descend, whereby as said lever moves away from the thrust-rod 50 the valve 40 can be shut by the dropping of the counterweighted lever 42. At the commencement of the drip period, as represented in Fig. 3, the rod 57 will have been carried against the stop 56' on the beam B', the latter thereby interrupting the advancing movement of the valve to permit a reduced or drip stream to enter the bucket. When the load is completed by this reduced stream, it, with the beam mechanism, will descend farther, so that the stop 56' will be carried away from the rod 57 to release the valve 40, so that the latter can be closed by the farther dropping of the counterweighted arm 42. When the valve has nearly reached the end of its stroke, it will carry the roll 63 on the lever 60 against and along the under face of the cam 64 on the toggle member 10, thereby breaking the toggle-joint 13, which results in freeing the closer L, so that said closer can be forced open by the weight of the material within the bucket G. When the load is discharged, the closer will be shut, and the remaining parts of the machine will return to their respective initial positions.

Having described my invention, I claim—

1. The combination, with weighing mechanism including a bucket having an opening; of a door for said opening, hinged to the bucket; and locking means for said door, effective to block the opening movement thereof during the descent of the bucket and during the discharge of a load by the latter.

2. The combination, with weighing mechanism including a bucket having a closer and also having an opening in a wall, of a door for said opening; and locking means for said door, effective as such until the bucket has reached the limit of its upstroke.

3. The combination, with weighing mechanism including a bucket having an opening, of a door for said opening; and locking means for said door, effective as such until the bucket has reached a predetermined point in its movement and also operative to block the descent of the weighing mechanism when the door is opened.

4. The combination, of weighing mechanism including a bucket having an opening, of a door for said opening; and instrumentalities for blocking the descent of the weighing mechanism when the door is opened.

5. The combination, with weighing mechanism including a bucket having an opening; of a door for said opening, locking means for said door effective as such until the bucket has reached a predetermined point in its movement and also operative to block the opposite movement of the bucket when the door is opened.

6. The combination, with weighing mechanism including a bucket having an opening between its receiving and delivery ends, of a stream-controller; a door for said opening, hinged to the bucket; and locking means for said door, operative independently of the stream-controller and adapted to block the opening movement of said door during the descent of the bucket.

7. The combination, with beam mechanism and with a bucket supported thereby having a closer and also having an opening in a wall by which access may be had to the interior of the bucket; of a door for said opening, hinged to the bucket; a stream-controller; and locking means operative independent of the stream-controller and effective as such until the bucket has reached the limit of its upstroke, said locking means being also operable to prevent the descent of the bucket when the door is opened.

8. The combination, with a bucket and with beam mechanism for supporting the same for reciprocatory movement, said bucket having an opening; of a door for said opening; and a pair of oppositely-extending brackets, one of which is attached to the door, the other bracket being positioned to block the action of the bracket that is connected to the door until the bucket has reached a predetermined point in its movement.

9. The combination, with framework and with a bucket, of beam mechanism for supporting said bucket for reciprocatory movement, said bucket having an opening; of a door for said opening; and a pair of brackets attached, respectively, to the door and to the framework, one of which is positioned to limit the action of the other.

10. The combination, with a bucket and with beam mechanism for supporting the same for reciprocatory movement, said bucket having an opening; of a door for said opening; and a pair of coacting brackets one of which is attached to the door and has a curved pin.

11. The combination, with a bucket having a closer, of a toggle connected to the closer and located to hold the same shut; a stream-controller; and an actuating device carried by the bucket and operated by the stream-controller, for flexing the toggle.

12. The combination, with a bucket having a closer, of a toggle to lock said closer shut; a stream-controller; a lever on the bucket, operative to break one of the joints of said toggle and actuated by the power of the stream-controller.

13. The combination, with a bucket having a closer; of a toggle to lock said closer shut, one of the toggle members having a cam and the other constituting a stop; a stream-controller having a stop coöperative with the first-mentioned stop; and a device for riding along the face of said cam, to thereby break a joint of the toggle.

14. The combination, with a bucket having a closer; of a toggle to lock said closer shut, one of the toggle members having a cam and the other constituting a stop; a stream-controller having a stop coöperative with the first-mentioned stop; and a device for riding along the face of the cam, to thereby break a joint of the toggle, said device being operatively connected with the stop that is operative with the stream-controller.

15. The combination, with a bucket having a closer; of a toggle to lock said closer shut, one of the toggle members having a cam and the other constituting a stop; a stream-controller having a stop coöperative with the first-mentioned stop; a lever located to ride along the face of the cam, to thereby break a joint of the toggle; and a link jointed, respectively, to said lever and to the valve-operative stop.

16. The combination, with weighing mechanism including a shiftable load-discharge member having a flange thereon; of an adjacent swinging regulator located to receive a load of material from the weighing mechanism and having an arm which normally abuts against said flange, the latter having at one end an overrun face and into contact with which said arm may be thrust when the shiftable member has nearly reached the end of its movement by pressure of the discharging material against said regulator.

17. The combination, with weighing mechanism including a bucket having a closer provided with a flange; of a swinging regulator located adjacent to the closer, to receive the impact of a load of material discharged by the bucket and having an arm which normally abuts against said flange, the latter having at one end an overrun face into contact with which said arm may be thrust, when the closer has nearly reached the end of its opening movement, by the pressure of the discharging material against said regulator.

18. The combination, with weighing mechanism including a bucket having a closer provided with a segmental flange; of a swinging regulator located adjacent to the closer, to receive the impact of a load of material to the bucket and having an arm which normally abuts against said flange, the latter having at one end an overrun face in contact with which said arm may be thrust, when the closer has nearly reached the end of its opening movement, by the pressure of the discharging material against said regulator.

19. A guard for a scale-beam, consisting of a body portion or shank of resilient material and two alined knife-edge-protecting hoods extending therefrom and provided with curved portions at their free ends.

20. The combination, with a scale-beam having a knife-edge, of a guard consisting of a shank adapted to straddle the scale-beam and a knife-edge-protecting hood.

21. The combination, with a scale-beam having a knife-edge a portion of which is rounded, of a guard consisting of a shank adapted to straddle said scale-beam and a knife-edge-protecting hood provided with a curved portion which is contiguous to the rounded portion of the knife-edge.

FRANCIS H. RICHARDS.

Witnesses:
FRED. J. DOLE,
F. N. CHASE.